Aug. 4, 1942.    R. M. WILEY ET AL    2,291,670
METHOD OF COATING WIRE AND THE LIKE
Filed Aug. 31, 1939

INVENTORS
Ralph M. Wiley
Arthur J. Dubord Jr.
BY Griswold & Burdick
ATTORNEYS

Patented Aug. 4, 1942

2,291,670

UNITED STATES PATENT OFFICE 2,291,670

METHOD OF COATING WIRE AND THE LIKE

Ralph M. Wiley, Midland, and Arthur J. Dubord, Jr., Battle Creek, Mich., assignors to The Dow Chemical Company, Midland, Mich., a corporation of Michigan Application August 31, 1939, Serial No. 292,908

4 Claims. (Cl. 18—59)

The present invention relates to a method of coating wire or other filamentous articles with plastics, and especially with those plastics which are crystalline by X-ray criteria.

Most synthetic resins are non-crystalline, even when examined by X-ray methods. These resins and polymers are not as strong and flexible as the few known synthetic resins and polymers which are crystalline according to X-ray criteria are capable of being made. The principal polymers and resins having this property, hereinafter referred to simply as crystalline polymers, are the polymer of vinylidene chloride and certain of its co-polymers wherein the vinylidene chloride predominates and generally wherein there is less than 20 per cent of the co-polymerized constituent. The crystalline polymers form shaped articles which are much improved in their strength and flexibility when they have been treated in a manner to orient the polymer molecules parallel to one another and to a major surface of the shaped article. This treatment, in the case of many crystalline polymers, requires the steps of heating the crystalline polymer to a temperature above its softening point but below its decomposition temperature, and then chilling the polymer to a temperature preferably near or below room temperature, thereby to supercool the polymer. While the polymer is in the supercooled state, it may be drawn, rolled, or otherwise plastically deformed under moderate pressures to orient the molecules in the manner aforesaid, and a substantial strength increase is obtained.

In coating wire with resins by the extrusion method employing crystalline polymers, a problem is presented which does not appear in the heretofore customary coating operations using non-crystalline polymers. The suggested problem is that of providing a coating of maximum toughness and flexibility, which coating has been drawn or stretched to orient the molecules therein. Methods of wire coating heretofore known have not had to provide for such a step and none of them are adapted to effect the desired result.

It is accordingly among the objects of the invention to provide a method of coating wire, string, thread, tape or similar filamentous articles with a coating preferably of uniform thickness, of a stretched and oriented form of a crystalline polymer. It is a particular object to provide such a method whereby a stretched and oriented coating of a crystalline polymer or co-polymer of vinylidene chloride may be applied to a filamentous article. It is a further object to provide filamentous articles, and particularly wire, coated with an oriented sheath of a crystalline polymer. Other objects will become apparent from the following description of the invention.

In the following description, the term "filamentous article" is intended to include any article such as wire, string, thread, or tape, which has a relatively great length as compared with its width and thickness, and which has near enough to a uniform cross-section throughout its length so that it may be coated in a continuous process.

To the accomplishment of the foregoing and related ends, the invention then consists of the method and product hereinafter fully described and particularly pointed out in the claims, the annexed drawing and the following description setting forth in detail one mode of carrying out the invention, such disclosed mode illustrating, however, but one of various ways in which the principle of the invention may be used.

According to the invention, wire or other filamentous article is coated with a crystalline polymer in oriented form, by extruding the crystalline but unoriented polymer at a temperature preferably above its softening point, through an extrusion nozzle wherein is centered an axially bored mandrel through which the wire to be coated is passed. The wire is drawn through the mandrel and out of the nozzle at a greater linear velocity than that at which the crystalline polymer is being extruded. Owing to the presence of the mandrel in the nozzle, the polymer coating emerges therefrom distributed around the wire with a space annular in cross-section between the wire and the coating. To assure continued centering of the wire in the coating, the extrusion nozzle may preferably be in a vertical position, with the wire being drawn downward through the coating mechanism. The polymer coating is chilled in a cooling zone to convert it to the supercooled state, and then is passed through a constricting device wherein the supercooled polymer is shrunk down onto the wire, eliminating said space from between the wire and the coating. The greater velocity of the wire as compared with that of the extruded coating, results in stretching the supercooled coating while passing through the constricting means. As the coated wire emerges from the constricting means, the coating has necessarily acquired the velocity of the wire, and the finished article is coated with a molecularly oriented sheath of tough, flexible crystalline polymer.

Figure 1:
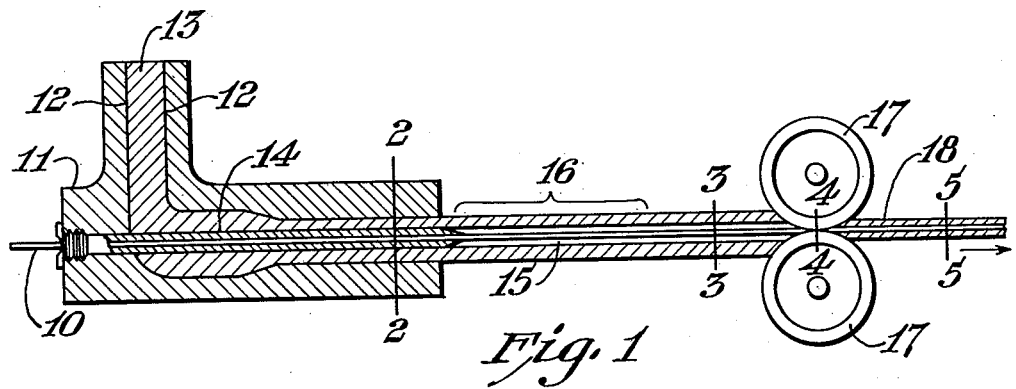
Fig. 1 is a longitudinal sectional view through a portion of a wire-coating system wherein the inventoin is carried out.
Figure 2:
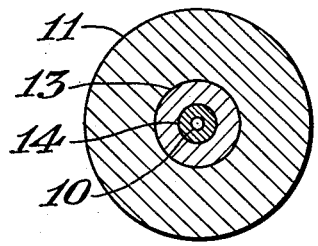
Fig. 2 is a cross-sectional view taken along lines 2—2 of Fig. 1.
Figure 4:
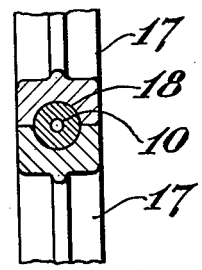
Fig. 4 is a cross-sectional view taken along lines 4—4 of Fig. 1.
Figure 3:
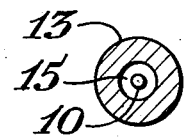
Fig. 3 is a cross-sectional view taken along lines 3—3 of Fig. 1.
Figure 5:
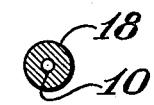
Fig. 5 is a cross-sectional view taken along lines 5—5 of Fig. 1.
Figure 6:
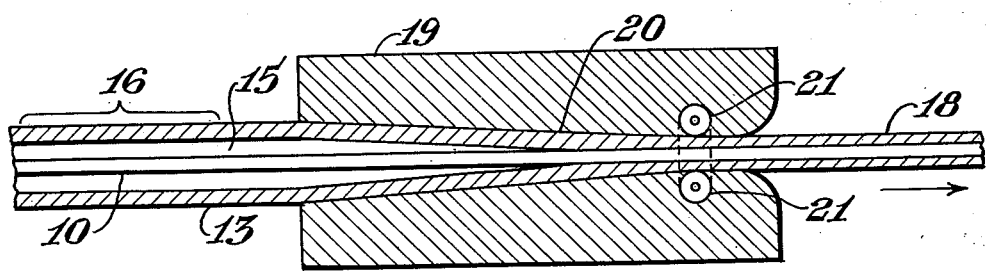
Fig. 6 is a longitudinal view of an enlarged section of a stretching device alternative to that shown in Fig. 1.

Referring now to the drawing wherein the apparatus illustrated in Figs. 1 and 6 may be employed either in vertical or horizontal position, a wire 10 is fed continuously through an axially bored mandrel 14 which is centered in the neck 12 of an extrusion nozzle 11. A crystalline polymer 13 is fed into the said neck 12 under pressure, and at a temperature preferably above its softening point, from a suitable supply source (not shown). The wire 10 is moved at a greater linear velocity than the coating material 13 is extruded from the nozzle. The mandrel 14 causes the formation of a space annular in cross-section 15 between the wire 10 and its coating as the two leave the nozzle 11. It is preferable to provide means for equalizing the pressure in said space with that of the atmosphere, and this may be done by using a mandrel bored slightly larger than the wire to be coated. The wire is then led through a cooling zone 16 wherein its loose sheath of coating material 13 is chilled to the supercooled state. The wire and coating are drawn through a constricting means, which may be one or more pairs of profiled rollers 17, to press the coating down onto the wire. As the coated wire 18 leaves the constricting means, the velocity of the wire and coating are necessarily the same, the coating now having attained the higher initial velocity of the wire. Thus, the coating which enters the constricting rollers 17 is simultaneously stretched and pressed down onto the wire by the action of these rollers in order to attain its ultimate velocity equal to that of the wire, and to fit snugly around the wire. By proper selection of the relative velocities of the wire 10, the extruded polymer 13 as the latter leaves the nozzle, and the diameter of rollers 17, any desired amount of stretching of the coating can be effected by the action of the constricting rollers 17. This ratio of velocities will be adjusted in practical operation according to the known amount of stretch required to orient the molecules in the particular crystalline polymer employed. Thus, a crystalline co-polymer of vinylidene chloride and vinyl chloride may be oriented when stretched to about 4 times its length in the extruded, supercooled, but unoriented state.

In Fig. 6 is shown another modification of a constricting means for use in place of the profiled rollers 17 shown in Fig. 1. A die 19 having a tapered throat 20, and which may or may not be provided with a sphincter 21 is used to bring the coating 13 down onto wire 10 to provide the finished coated article 18. Just as in the method described with respect to Fig. 1, the greater velocity of the wire as compared with that of the extruded and supercooled crystalline polymer, results in stretching the polymer and in orienting the molecules therein to provide a tough flexible coating on the wire.

It should be noted that any pull exerted on the coating between the extrusion nozzle and the constricting means 17 or 19, results in stretching the coating only in the warm zone adjacent the orifice. Hence, the constricting means must act as a snubber to absorb any pull, applied to coated wire 18 for the purpose of stretching the coating 13, to prevent the force from being transmitted back to the zone of thermoplasticity near the extrusion orifice.

The strength of crystalline polymers after being heated, supercooled, and stretched to provide molecular orientation is many-fold that of the same polymer in an unstretched or unoriented condition. The invention, then, provides a valuable method of coating wire, string, thread, tape or similar filamentous articles with a tough, flexible coating, the strength of which may approach or even exceed that of the filamentous article. Thus, the tensile strength of a stretched, oriented form of crystalline vinylidene chloride co-polymers may be as high as 45,000 to 70,000 pounds per square inch of original cross-section, while that of a similar shape of unoriented crystalline polymer may vary from a few pounds to a maximum of about 10,000 pounds per square inch.

In addition to the coating of wire, herein illustrated, the invention may be applied to the coating of strings, thread or braided cordage for the preparation, for example, of strong, water-repellent fish-lines, or it may be employed to provide coated tapes of metal, woven wire, or cloth. These and many similar "filamentous articles" may be coated with crystalline polymers according to the method of the invention to provide useful articles of improved strength and flexibility. The coated wire of the invention may be of a size and coating thickness for electrical service, or it may be very fine wire, e. g. from 1 to 2 mils diameter, coated with an oriented crystalline polymer for use as a fishing leader of improved tensile and shear strengths and having high flexibility.

Other modes of applying the principle of our invention may be employed instead of the one explained, change being made as regards the method herein disclosed, provided the step or steps stated by any of the following claims or the equivalent of such stated step or steps be employed.

We therefore particularly point out and distinctly claim as our invention:

1. The method of coating filamentous articles comprising continuously moving the filamentous article to be coated through an axially bored mandrel disposed centrally of an extrusion head, continuously extruding a crystalline polymer at a temperature above its softening point around said mandrel and through an orifice, thereby to form a sheath of the polymer around the said article with a space annular in cross-section therebetween, the velocity of the filamentous article being greater than that of the surrounding sheath, chilling the so-extruded sheath to supercool the same, passing the filamentous article and surrounding sheath through a constricting means operative on the sheath to press it down upon the article forming a coating thereon, and maintaining tension on the coated filamentous article beyond the said constricting means to effect a stretching of the coating while passing through the constricting means, thereby to equalize the velocities of the coating and the article and to orient the molecules in the crystalline polymer to provide a tough, flexible coating adherent to the filamentous article, the said constricting means being adapted to prevent transmission of tension, applied to the coated article, to the extruded sheath between the said means and the extrusion orifice.

2. The method as claimed in claim 1, wherein the coating material is selected from the group consisting of the polymer of vinylidene chloride and its crystalline co-polymers.

3. The method as claimed in claim 1, wherein the filamentous article is wire.

4. The method as claimed in claim 1, wherein the filamentous article is wire and the coating material is selected from the group consisting of the polymer of vinylidene chloride and its crystalline co-polymers.

RALPH M. WILEY.
ARTHUR J. DUBORD, Jr.